United States Patent

[11] 3,608,581

[72] Inventor Roger L. Sweet
 Ferndale, Mich.
[21] Appl. No. 28,994
[22] Filed Apr. 16, 1970
[45] Patented Sept. 28, 1971
[73] Assignee Ross Operating Valve Company
 Detroit, Mich.

[54] QUICK EXHAUST VALVE
 10 Claims, 3 Drawing Figs.
[52] U.S. Cl. ................................................ 137/509,
 137/102
[51] Int. Cl. ........................................ F16k31/143
[50] Field of Search .......................... 137/494,
 513.5, 625.68, 596.2, 102, 508, 596.13, 509;
 91/451

[56] References Cited
 UNITED STATES PATENTS
2,270,549 1/1942 Orr .............................. 137/102

| | | | |
|---|---|---|---|
| 2,574,022 | 11/1951 | Dahl | 137/508 X |
| 2,991,846 | 7/1961 | Bystricky et al. | 137/509 X |
| 3,039,440 | 6/1962 | Warnock | 91/451 |
| 3,196,901 | 7/1965 | Phillipps | 137/494 |

Primary Examiner—M. Cary Nelson
Assistant Examiner—Robert J. Miller
Attorney—Harness, Dickey & Pierce ABSTRACT: A valve for quickly exhausting a working chamber such as for a press clutch and brake actuator. A cylindrical body has a bore open to the chamber and leading to a transverse vent passage. A poppet is slidable in said body between a closed position separating the chamber from the vent, and an open position. An annular chamber is formed between the poppet and body, and a unidirectional annular seal on the poppet permits rapid filling of this chamber. A restricted passage is provided for exhausting the chamber. The valve is closed by the pressure differential across the valve sealing area, plus a spring, and is opened by pressure on said seal.

PATENTED SEP 28 1971

3,608,581

INVENTOR.
Roger L. Sweet
BY Harness, Dickey & Pierce
ATTORNEYS.

QUICK EXHAUST VALVE

BACKGROUND OF THE INVENTION

1. Field of the Invention

The invention relates to quick exhaust or dump valves, and particularly to valves which will rapidly exhaust working chambers such as for brake and clutch actuators. These are used for example in connection with mechanical presses, where rapid cycling of the machine is often required for high production work. Valves of this type are connected directly to the actuator working chamber, and respond to a pressure drop in this chamber to vent the chamber so as to rapidly complete the exhaust portion of the cycle.

2. Description of the Prior Art

An example of such a device is found in FIG. 3 of Warnock U.S. pat. No. 3,039,440, dated June 19, 1962. This device has a body with a bore connected to the working chamber and a poppet slidable within the body. A restricted passage leads through this poppet to a valve opening chamber which, when pressure is built up therein, will open the poppet valve in response to a drop in working chamber pressure.

Because both filling and evacuation of the valve opening chamber is through this restricted passage, definite limitations are placed on the cycle time of this prior art valve. Furthermore, the known valve is of limited sensitivity when moving to its exhaust or dumping position, because of the substantial pressure differential which holds the valve closed.

SUMMARY OF THE INVENTION

According to the invention, a valve body is provided having a bore one end of which is open to the working chamber, and a transverse vent passage. A poppet is slidable in said bore and forms an annular chamber therewith. The poppet has a central bore and a annular end sealing area which engages a transverse seat to separate the working chamber from the vent. Pressure in the annular chamber is used to shift the valve to its open or dumping position. This pressure is built up through a restricted passage connecting the poppet bore with the annular chamber and a unidirectional seal carried by the poppet which permits rapid filling of the annular chamber. A spring is preferably used to urge the valve to a closed position. As pressure in the working chamber drops, the pressure in said annular chamber exerts force on said unidirectional seal to open the valve and quickly exhaust the working chamber. The mean diameter of the end sealing area on the poppet is so chosen as to control the force needed to open the valve.

DESCRIPTION OF THE PREFERRED EMBODIMENT

Figure 1:
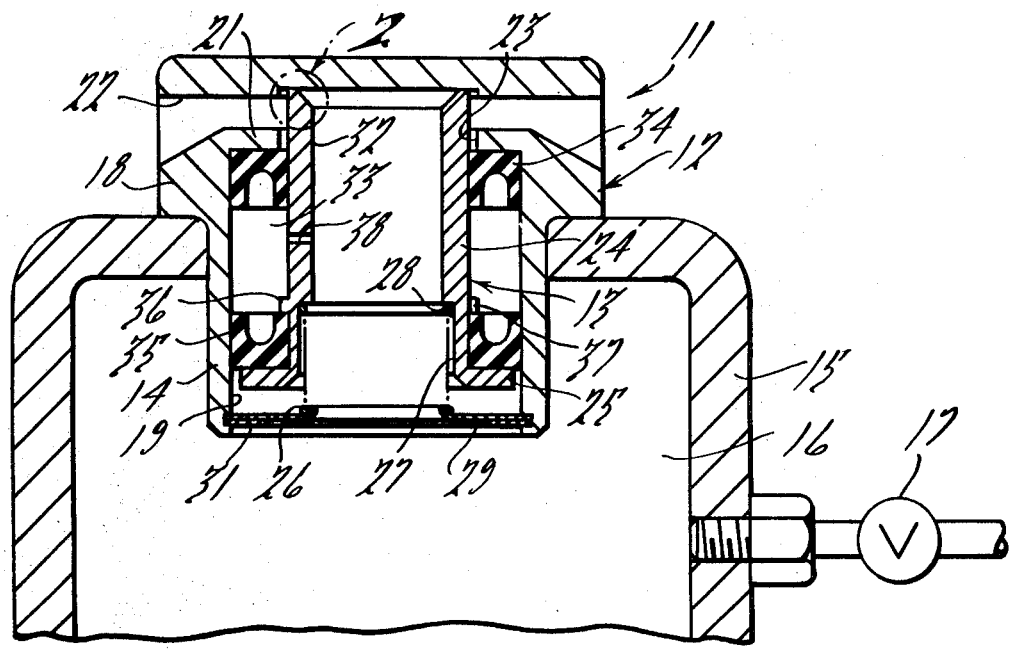
FIG. 1 is a cross-sectional view in elevation of the invention, the valve being shown in its closed position mounted in a working chamber wall.

The valve is generally indicated at 11 and comprises a valve body generally indicated at 12 and a poppet generally indicated at 13. Valve body 12 has a cylindrical portion 14 mounted in the wall 15 of a chamber indicated partially at 16. This chamber may be the actuating chamber of a brake and clutch mechanism (not shown) for a mechanical press, although the invention is not limited to the use of valve 11 in this embodiment. Chamber 16 is alternately pressurized and evacuated by valve means indicated schematically at 17. In applications such as a press brake and clutch, pressurizing of chamber 16 may actuate the clutch for a work operation, while evacuation of the chamber effects a declutching and braking step. It is desirable that the cycling of the clutch and brake operation be rapid in order to increase the production rate.

Valve body 12 has an enlarged portion 18 outside chamber 16. A central bore 19 is formed in body 12, this bore being open to chamber 16 and terminating at a wall 21. A transverse vent passage 22 extends through portion 18 of body 12, a clearance aperture 23 being provided in wall 21 for poppet 13.

The poppet has a cylindrical main portion 24 and an enlarged head 25, the poppet being disposed within bore 19 and extending through aperture 23 with head 25 being adjacent the open end of the bore. A helical coil compression spring 26 is disposed within a counterbore portion 27 of poppet 13, the inner end of this spring resting against the shoulder 28 on the poppet and the outer end being supported by a retainer 29. This retainer is held adjacent the open end of bore 19 by a snapring 31.

A bore 32 extends through poppet 13 from counterbore 27 to the outer end of the poppet. The diameter of poppet portion 24 is considerably less than that of bore 19 so that a chamber 33 is formed therebetween. An annular seal 34 is disposed adjacent wall 21 and engages bore 19 and poppet portion 24, thus constituting one end of chamber 33. The opposite end of the chamber is formed by an annular unidirectional seal 35. This seal is shown as being a U-cup type of seal which is disposed between head 25 of socket 13 and a shoulder 36 thereon. The outer diameter of head 25 is substantially less than the diameter of bore 19, and a plurality of circumferentially spaced notches 37 are formed in shoulder 36. The arrangement is such that air may flow from chamber 16 into bore 19, around seal 35 and into chamber 33, but seal 35 will resist flow from chamber 33 toward chamber 16. A restricted passage 38 is provided, however, between chamber 33 and working chamber 16. This constitutes a radial passage in poppet 13 which will permit controlled decompression of chamber 33. Although seal 34 is shown as a U-shaped type of seal, it should be understood that this seal need not be unidirectional in nature for purposes of the invention.

The surface 39 of outer body wall 41 (FIG. 2) is flat and acts as a seal which the outer sealing surface 42 of poppet portion 24 engages when the valve is closed. Although the area of seal surface 42 could theoretically be negligible, as a practical matter is necessary to provide some area to prevent excessive wearing of the parts. As will be described below, this area, and more particularly the location of its mean diameter, furnishes a measure of the amount of force which hold poppet 13 in its closed position and which, therefore, is needed to open the valve. The strength of spring 26 need only be slightly greater than that necessary to overcome frictional drag of the parts. The area of seal 35 against which pressure acts to open the valve should be substantially greater than the closing forces.

Figures 2, 3:
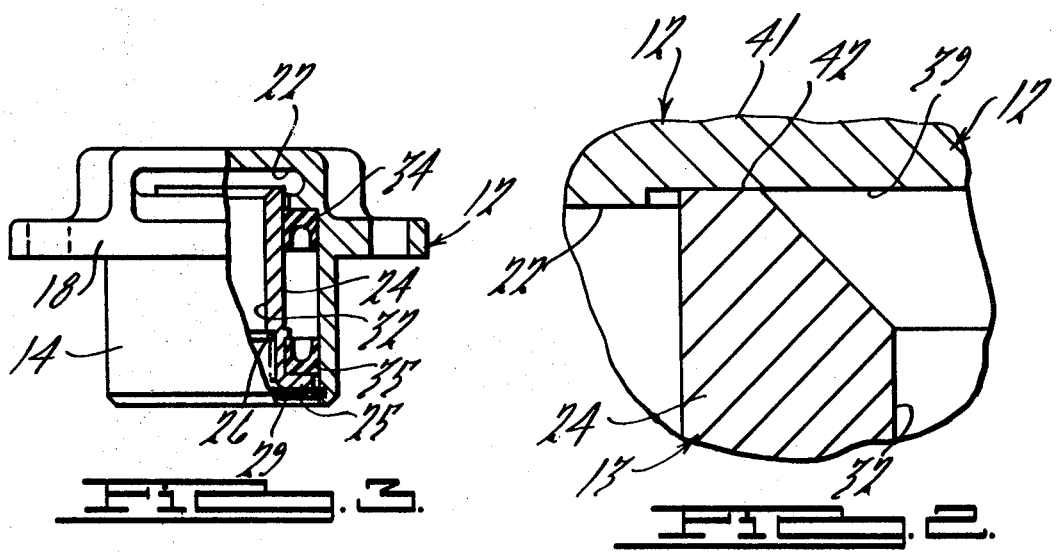
FIG. 2 is an enlarged fragmentary cross-sectional view taken in the area marked 2 of FIG. 1 and showing the valve sealing surface.
FIG. 3 is a partially cross-sectioned view of the valve in its open or dumping position.

In operation, let us assume that the parts are initially in their FIG. 1 position but that chamber 16 is evacuated. At this point there will be no pressure in chamber 33 or in any other portions of the device. Upon application of pressure to chamber 16, air will flow into bore 19 of body 12 and bore 32 of poppet 13. Air will also rapidly fill chamber 33 by passing around seal 35 and through restriction 38. Poppet 13 will be held in its closed position as shown in FIGS. 1 and 2 by spring 26 and the differential pressure area determined by the location of surface 42.

When evacuation of chamber 16 is initiated by valve 17, pressure will be reduced rapidly in bores 19 and 32. The pressure in chamber 33 acting against seal 35 will, therefore overcome the force of spring 28 and the pressure differential force created by surface 42 and shift poppet 13 to its FIG. 3 position. This will rapidly dump the remaining pressure from chamber 16. The pressure in chamber 33 will slowly be dissipated through restriction 38, at which time spring 28 will return poppet 13 to its FIG. 1 position.

Should pressure be reapplied to a chamber 16 by valve 17 before the pressure in chamber 33 has been dissipated, poppet 13 will be immediately returned to its closed position by virtue of the fact that the chamber 33 pressure is counteracted. It will be observed that the presence of enlarged aperture 23 will tolerate misalignment of poppet 13 during closing, and will also compensate for any distortion of body 12 due to installation or mounting.

It should also be noted that the location of the mean diameter of sealing surface 42 controls the net seating force of the poppet, that is, the amount of force holding poppet 13 closed and, therefore, the force necessary to open the poppet. Thus, for example, if it is desired to open the poppet in response to a very slight pressure drop in chamber 16, the mean diameter would be located in close proximity to the outside diameter of main portion 24 of the poppet.

What is claimed is:

1. In a quick exhaust valve, a valve body having a central bore open at one end to a working chamber to be alternately pressurized and evacuated, and a transverse vent passage at the opposite end of said body, a poppet slidable in said body between open and closed positions, said poppet having a head portion in said body and a cylindrical portion extending therefrom towards the transverse vent passage, a sealing surface at said outer end of the poppet and a seating surface in said body which said sealing surface engages when the valve is closed, an annular chamber formed between said body bore and said cylindrical portion of the poppet, a seal between said cylindrical poppet portion and said body at the end of said chamber adjacent said vent passage, an annular unidirectional seal adjacent the head of said poppet and forming the other end of said annular chamber, said last-mentioned seal permitting flow only from the open end of said body bore towards said chamber but preventing flow in the opposite direction, a bore extending through said poppet, and a restricted passage between said annular chamber and said working chamber, whereby pressure applied to said working chamber will rapidly pressurize said annular chamber and said working chamber, whereby pressure applied to said working chamber will rapidly pressurize said annular chamber by means of said unidirectional seal and will cause said poppet to move to its closed position by the pressure differential area created by the sealing surface of said poppet, reduction of pressure in said working chamber permitting the pressurized annular chamber to act against said unidirectional seal to thereby open said valve and dump the working chamber.

2. The combination according to claim 1, said restricted passage comprising a radial passage in said cylindrical portion of the poppet.

3. The combination according to claim 1, said sealing surface of the poppet comprising an area at the end of said cylindrical portion engaging a flat seating surface in said body, the mean diameter of said area being so located with respect to the outside diameter of the cylindrical portion of the poppet as to control the net seating force of the poppet.

4. The combination according to claim 1, said poppet head having a substantially lesser diameter than said body bore.

5. The combination according to claim 1, further provided with a spring urging said poppet in a closing direction.

6. The combination according to claim 5, said spring comprising a helical coil compression spring having one end engageable with a shoulder on said poppet and the other end supported by a spring retainer in said body.

7. The combination according to claim 6, said poppet head having a substantially lesser diameter than said body bore.

8. The combination according to claim 7, further provided with a spring urging said poppet in a closing direction.

9. The combination according to claim 1, further provided with a wall in said body between said chamber and said vent passage, said wall having an enlarged clearance aperture for said poppet which will tolerate misalignment thereof.

10. The combination according to claim 9, said chamber seal adjacent said vent passage being supported by said wall.

UNITED STATES PATENT OFFICE
CERTIFICATE OF CORRECTION

Patent No. 3,608,581          Dated September 28, 1971

Inventor(s) Roger L. Sweet

It is certified that error appears in the above-identified patent and that said Letters Patent are hereby corrected as shown below:

Column 2, line 43, "hold" should be --holds--. Column 3, line 30, delete "and said working chamber"; line 31, delete entire line; and line 32, delete "pressurize said annular chamber".

Signed and sealed this 18th day of April 1972.

(SEAL)
Attest:

EDWARD M. FLETCHER, JR.          ROBERT GOTTSCHALK
Attesting Officer                Commissioner of Patents